US008625941B1

(12) United States Patent
Shi et al.

(10) Patent No.: US 8,625,941 B1
(45) Date of Patent: Jan. 7, 2014

(54) BROADBAND REFLECTIVE WAVEGUIDE METAL GRATINGS AND THEIR FORMATION

(75) Inventors: Zhong Shi, Fremont, CA (US); Hongxing Yuan, Fremont, CA (US); Shing Lee, Fremont, CA (US); Zhongyan Wang, San Ramon, CA (US); Ge Yi, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 351 days.

(21) Appl. No.: 12/784,429

(22) Filed: May 20, 2010

(51) Int. Cl.
G02B 6/34 (2006.01)
G02B 6/14 (2006.01)

(52) U.S. Cl.
USPC .............................................. 385/37; 385/14

(58) Field of Classification Search
USPC .......................................................... 385/37
See application file for complete search history.

(56) References Cited

U.S. PATENT DOCUMENTS

| | | | |
|---|---|---|---|
| 4,743,083 A * | 5/1988 | Schimpe | 385/37 |
| 5,625,729 A * | 4/1997 | Brown | 385/31 |
| 6,275,453 B1 | 8/2001 | Ueyanagi et al. | |
| 6,671,127 B2 | 12/2003 | Hsu et al. | |
| 6,687,195 B2 | 2/2004 | Miyanishi et al. | |
| 6,795,630 B2 | 9/2004 | Challener et al. | |
| 6,834,027 B1 | 12/2004 | Sakaguchi et al. | |
| 6,975,580 B2 | 12/2005 | Rettner et al. | |
| 7,027,700 B2 | 4/2006 | Challener | |
| 7,042,810 B2 | 5/2006 | Akiyama et al. | |
| 7,171,080 B2 | 1/2007 | Rausch | |
| 7,190,539 B1 | 3/2007 | Nibarger | |
| 7,266,268 B2 | 9/2007 | Challener et al. | |
| 7,272,079 B2 | 9/2007 | Challener | |
| 7,330,404 B2 | 2/2008 | Peng et al. | |
| 7,440,660 B1 | 10/2008 | Jin et al. | |
| 7,500,255 B2 | 3/2009 | Seigler et al. | |
| 7,567,387 B2 | 7/2009 | Itagi et al. | |
| 7,580,602 B2 | 8/2009 | Itagi et al. | |
| 7,596,072 B2 | 9/2009 | Buechel et al. | |
| 7,649,677 B2 | 1/2010 | Jin et al. | |
| 7,839,497 B1 | 11/2010 | Rausch et al. | |
| 8,116,171 B1 | 2/2012 | Lee | |
| 8,125,856 B1 | 2/2012 | Li et al. | |
| 2001/0006435 A1 | 7/2001 | Ichihara et al. | |
| 2001/0017820 A1 | 8/2001 | Akiyama et al. | |
| 2003/0039443 A1 * | 2/2003 | Catchmark et al. | 385/37 |
| 2003/0184903 A1 | 10/2003 | Challener | |
| 2003/0198146 A1 | 10/2003 | Rottmayer et al. | |
| 2004/0001420 A1 | 1/2004 | Challener | |
| 2004/0027728 A1 | 2/2004 | Coffey et al. | |
| 2004/0223249 A1 | 11/2004 | Kang et al. | |

(Continued)

FOREIGN PATENT DOCUMENTS

EP 1501076 A1 1/2005
EP 1498878 B1 4/2008

*Primary Examiner* — Eric Wong

(57) ABSTRACT

Devices having reflective grating structures and methods of fabricating the same are disclosed. A bottom clad layer is disposed above a substrate. A waveguide core layer is disposed above the bottom clad layer. A top clad layer is disposed above the waveguide core layer. At least one metal grating structure is disposed adjacent to an interface between the waveguide core layer and one of the bottom clad layer and the top clad layer, where the at least one metal grating structure is configured to reflect at least a portion of an incident electromagnetic radiation coupled into the waveguide core layer.

33 Claims, 9 Drawing Sheets

(56) References Cited

U.S. PATENT DOCUMENTS

| | | |
|---|---|---|
| 2004/0228022 A1 | 11/2004 | Ueyanagi |
| 2005/0047013 A1 | 3/2005 | Le et al. |
| 2005/0289576 A1 | 12/2005 | Challener |
| 2007/0081426 A1 | 4/2007 | Lee et al. |
| 2007/0081427 A1 | 4/2007 | Suh et al. |
| 2008/0055343 A1 | 3/2008 | Cho et al. |
| 2008/0180827 A1 | 7/2008 | Zhu et al. |
| 2008/0181560 A1 | 7/2008 | Suh et al. |
| 2008/0198496 A1 | 8/2008 | Shimazawa et al. |
| 2008/0232225 A1 | 9/2008 | Cho et al. |
| 2011/0228651 A1 | 9/2011 | Gage et al. |
| 2011/0228652 A1 | 9/2011 | Gage et al. |
| 2012/0113770 A1 | 5/2012 | Stipe |

* cited by examiner

BROADBAND REFLECTIVE WAVEGUIDE METAL GRATINGS AND THEIR FORMATION

FIELD OF THE INVENTION

The present invention generally relates to reflective waveguides and, in particular, relates to broadband reflective waveguide metal gratings and their formations.

BACKGROUND

Reflective waveguide grating (RWG) structure is an optical device that is configured to reflect a portion of an input electromagnetic (EM) radiation (e.g., laser light) travelling in a waveguide. An RWG structure is a critical component for many optical components, such as distributed-feedback (DFB) lasers for frequency selection. In energy-assisted magnetic recording (EAMR) applications, an RWG structure can be used to enhance the near-field transducer (NFT) excitation efficiency.

An RWG structure can include periodic or aperiodic variations at an interface between a core layer and a clad layer of the waveguide. Conventional RWG structures include a dielectric grating having such periodic or aperiodic variations. However, such conventional RWG structures with dielectric gratings do not provide enough reflectivity bandwidth to meet requirements of certain broadband reflection applications (e.g., EAMR heads).

A metallic mirror may provide an alternative solution for broadband reflection applications, but such a mirror often require deposition a thick (e.g., >100 nm) metallic layer, complicating the fabrication process.

Accordingly, a need exists for a reflective waveguide grating structure that can provide a wideband reflection of incident EM radiation.

BRIEF SUMMARY OF THE INVENTION

A device having a reflective grating structure is provided. The device can comprise a substrate, a bottom clad layer above the substrate, a waveguide core layer above the bottom clad layer, a top clad layer above the waveguide core layer. The device can further comprise at least one metal grating structure disposed adjacent to an interface between the waveguide core layer and one of the bottom clad layer and the top clad layer, the at least one metal grating structure configured to reflect at least a portion of an incident electromagnetic (EM) radiation coupled into the waveguide core layer.

A method of fabricating a reflective grating structure is disclosed. The method can comprise providing a substrate, depositing a bottom clad layer over the substrate, depositing a waveguide core layer over the bottom clad layer, and depositing a top clad layer over the waveguide core layer. The method can further comprise forming a metal grating structure adjacent to the waveguide core layer.

A method of reflecting an incident electromagnetic (EM) radiation is disclosed. The method can comprise providing a waveguide structure comprising a waveguide core layer and at least one metal grating structure disposed adjacent to the waveguide core layer. The method can further comprise coupling an EM radiation into the waveguide core layer and reflecting at least a portion of the coupled EM radiation by the at least one metal grating structure.

DETAILED DESCRIPTION

Figure 1:
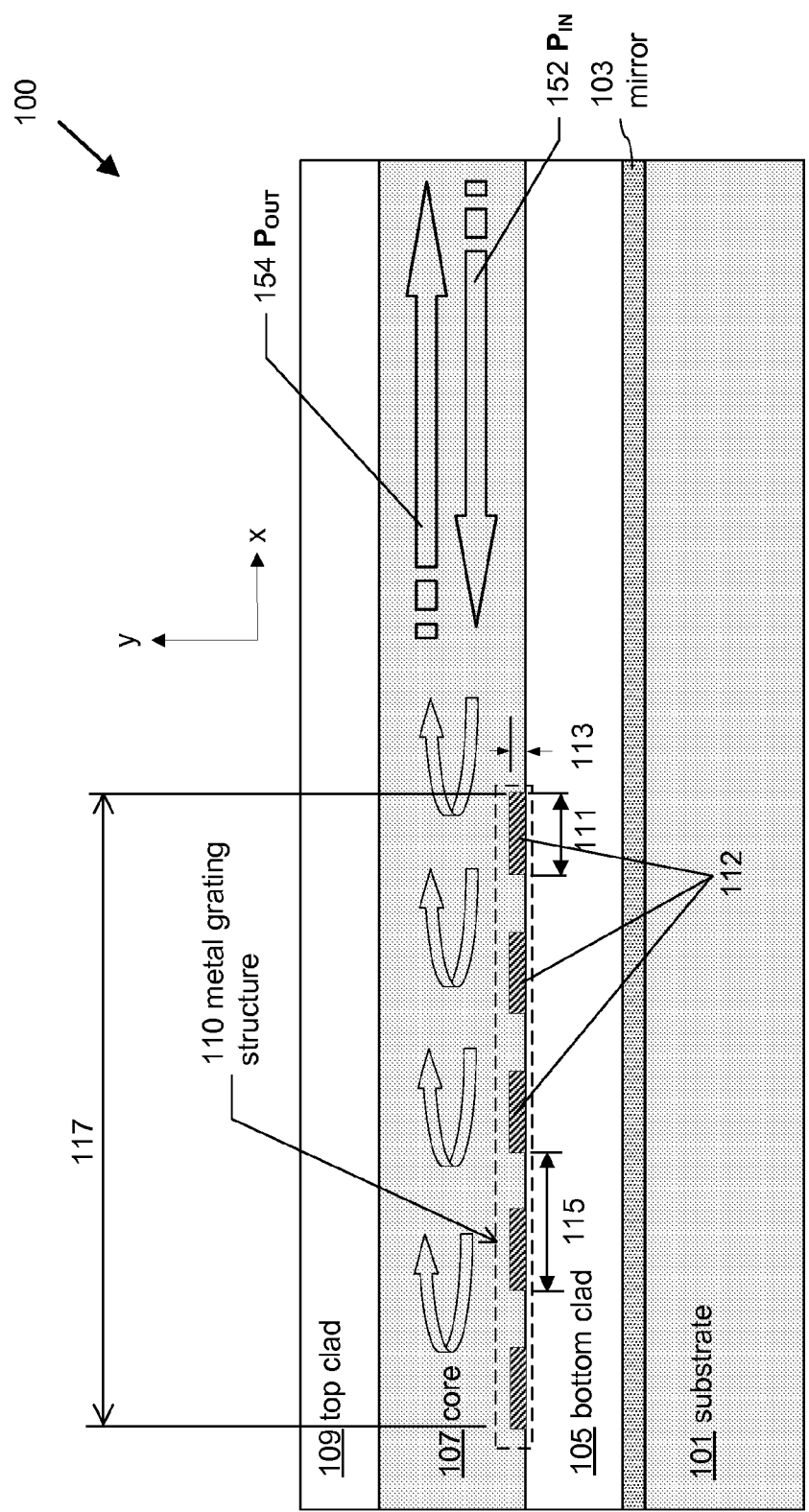
FIG. 1 is a diagram depicting a cross-sectional view of an exemplary reflective waveguide grating structure according to certain aspects of the subject disclosure.

FIG. 1 is a diagram depicting a cross-sectional view of an exemplary reflective waveguide grating (RWG) structure 100 according to certain aspects of the subject disclosure. The RWG structure 100 includes a substrate 101, a bottom clad layer 105 over the substrate 101, a waveguide core layer 107 over the bottom clad layer 105, a top clad layer 109 over the waveguide core layer 107, and a metal grating structure 110 disposed at an interface between the bottom clad layer 105 and the core layer 107. In the illustrated example, the metal grating structure 110 is embedded in the core layer 107 directly above the bottom clad layer 105.

In operation, an incident electromagnetic (EM) radiation 152 is coupled into the core layer 107 from an EM radiation source (e.g., laser). The incident EM radiation 152 travels in a first direction (e.g., in −x direction in the illustrated example) within the core layer 107. The incident EM radiation 152 encounters the metal grating structure 110, which reflects at least a portion of the incident EM radiation 152 along the length of the metal grating structure 110 to form reflected EM radiation 154 that travels in a second direction (e.g., to +x direction in the illustrated example) within the core layer 107.

In the illustrated example, the RWG structure 100 further includes a reflective layer 103 (e.g., mirror) disposed between the substrate 101 and the bottom clad layer 105. The reflective layer 103 is configured to cause an uncoupled portion of an EM radiation traveling toward the substrate 112 to reflect back toward the waveguide core layer 107 where it can be given another chance to be coupled into the waveguide core layer 107. The reflective layer can include any reflective material including, but not limited to, Au, Ag, Al, Cu or a combination thereof.

The metal rib 112 can include any conductive material (e.g., a metal or an alloy) including, but not limited to, Au, Ag, Al, or a combination thereof. The waveguide core layer 107 can include any transparent or semi-transparent material including, but not limited to, $TiO_2$, $Ta_2O_5$, Si, SiN, and ZnS. For confinement of the incident and reflected EM radiation 152, 154 within the waveguide core layer 107, the index of refraction of the material(s) comprising the bottom and top clad layers 105, 109 is lower than that of the material comprising the waveguide core layer 107. The material comprising the top and bottom clad layers can include any transparent or semi-transparent material including, but not limited to, $Al_2O_3$ and $SiO_2$.

The metal grating structure 110 includes a series of metal ribs 112 disposed along a length direction (e.g., x-direction) of the core layer 107. Each metal rib 112 has rib length 111 and rib height 113. The metal grating structure 110 is characterized by a grating length 117 representing a total linear distance of the series of metal ribs 112, a grating pitch 115 representing a separation between two consecutive metal ribs 112, and a duty cycle representing a ratio between the rib length 111 and the grating pitch 115.

The rib length 111, the rib height 113, the grating pitch 115, the duty cycle, and the grating length 117 represent some of design parameters that can be selected to optimize certain performance characteristics of the RWG structure 100. For example, one or more of the above-identified design parameters can be selected so as to maximize a reflectivity at a peak wavelength of the incident EM radiation 152. As another example, one or more of the above-identified design parameters can be selected so as to maximize a reflectivity bandwidth of the metal grating structure 110. As yet another example, one or more of the above-identified design parameters can be selected so as to achieve an optimal combination of peak reflectivity and reflectivity bandwidth of the metal grating structure 110. In certain embodiments, one or more design parameter are selected such that the peak reflectivity is in a range of between about 0.1 and 0.9, and the reflectivity bandwidth is between about 5 and 30 nm.

In certain embodiments, the rib length 111 can be in a range between about ¼ of the effective wavelength of the EM radiation 152 inside the waveguide, and the rib height 113 can be in a range between about 10 and 20 nm. In certain embodiments, grating pitch 115 can be in a range between about 400 and 600 nm. In certain embodiments, the duty cycle can be in a range between about 25% and 50%. In certain embodiments, the grating length 117 can be in a range between about 10 and 200 μm. In general, all other parameters being the same, the longer the grating length 117, the higher is the reflectivity of the RWG structure 100. In addition, a thickness (e.g., in y-direction) of the bottom clad layer 105 can be tuned to achieve a correct phase match and to maximize the reflectivity. In general, thickness of the bottom clad layer 105 can be in a range between about 700 and 800 nm.

It shall be appreciated by those skilled in the art that the RWG structure 100 of FIG. 1 is provided for purposes of illustration only, and various changes, including additions, modifications, and/or deletions, may be made to the illustrated embodiment without departing from the scope of the subject disclosure. For example, in some alternative embodiments, the reflective layer 103 may not be present or is disposed above the top clad layer 109. In some alternative embodiments, the metal grating structure 110 may be aperiodic with a distribution of grating pitches. Such a distribution may be selected, e.g., to maximize a total amount of reflection of the incident EM radiation 152. In some alternative embodiments, a portion or all of the RWG structure 100 along the length direction may be curved instead of being straight. In some alternative embodiments, the metal grating structure 100 may be embedded in the waveguide core layer 107, either directly or proximately below the top clad layer 109.

Figure 2:
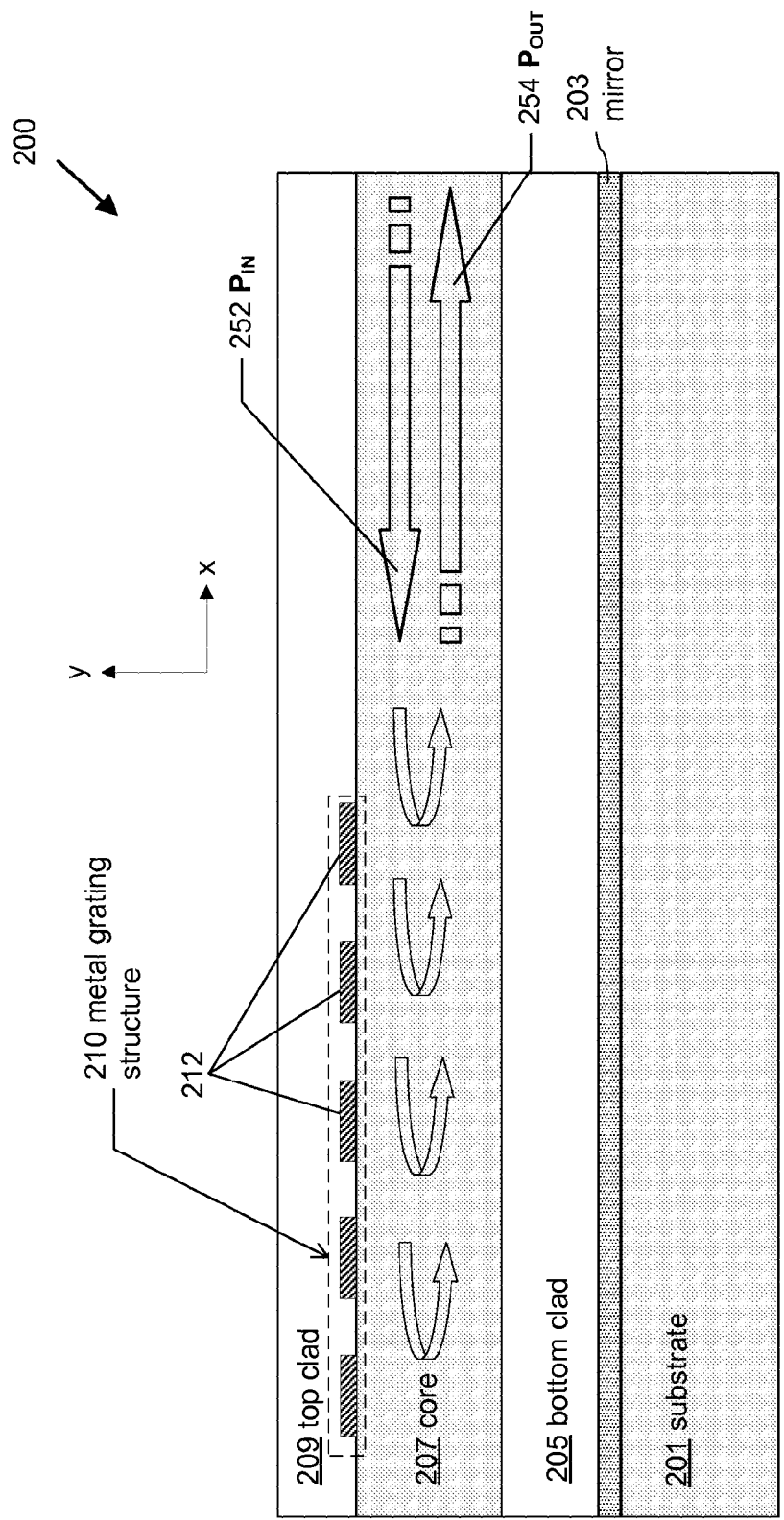
FIG. 2 is a diagram depicting a cross-sectional view of an exemplary reflective waveguide grating structure according to certain alternative aspects of the subject disclosure.

FIG. 2 is a diagram depicting a cross-sectional view of an exemplary reflective waveguide grating (RWG) structure 200 according to certain alternative aspects of the subject disclosure. The RWG structure 200 includes a substrate 201, a reflective layer 203 over the substrate, a bottom clad layer 205 over the reflective layer 203, a waveguide core layer 207 over the bottom clad layer 205, a top clad layer 209 over the waveguide core layer 207, and a metal grating structure 210 disposed at an interface between the bottom clad layer 205 and the core layer 207.

Various component layers 201, 203, 205, 207, 209 of the RWG structure 200 are substantially similar to corresponding component layers 101, 103, 105, 107, 109 of the RWG structure 100 of FIG. 1, and are thus not repeated here for the sake of brevity. Also various features and characteristics of the metal grating structure 210, such as rib length, rib height, duty cycle, grating length, and their relationships to performance characteristics (e.g., reflectivity and reflectivity bandwidth), can be substantially similar to corresponding features and characteristics of the metal grating structure 110, and are thus not repeated for the sake of brevity. A main difference between the RWG structure 200 and the RWG structure 100 lies in the position of the respective metal grating structure with respect to component layers of the respective RWG structure. The metal grating structure 110 is disposed at or near an interface between the bottom clad layer 105 and the waveguide core layer 107, while the metal grating structure 210 is disposed at or near an interface between the waveguide core layer 207 and the top clad layer 209.

In operation, an incident electromagnetic (EM) radiation 252 is coupled into the core layer 207 from an EM radiation source (e.g., laser). The incident EM radiation 252 travels in a first direction (e.g., in −x direction in the illustrated example) within the core layer 207. The incident EM radiation 252 encounters the metal grating structure 210, which reflects at least a portion of the incident EM radiation 252 along the length of the metal grating structure 210 to form reflected EM radiation 254 that travels in a second direction (e.g., to +x direction in the illustrated example) within the core layer 107.

It shall be appreciated by those skilled in the art that the RWG structure 200 of FIG. 2 is provided for purposes of illustration only, and various changes, including additions, modifications, and/or deletions, may be made to the illustrated embodiment without departing from the scope of the subject disclosure. All or some of the changes associated with alternative embodiments discussed above with respect to FIG. 1, including the absence or alternative position of the reflective layer, may be applicable to the RWG structure 200. In addition, in some alternative embodiments, the metal grating structure 210 may be embedded in the waveguide core layer 207 directly or proximately below the top clad layer 209. In some alternative embodiments, the RWG structure 200 may also include a metal grating structure disposed at or near an interface between the bottom clad layer 205 and the waveguide core layer 207 in addition to the metal grating structure 210 shown in FIG. 2.

Figure 3:
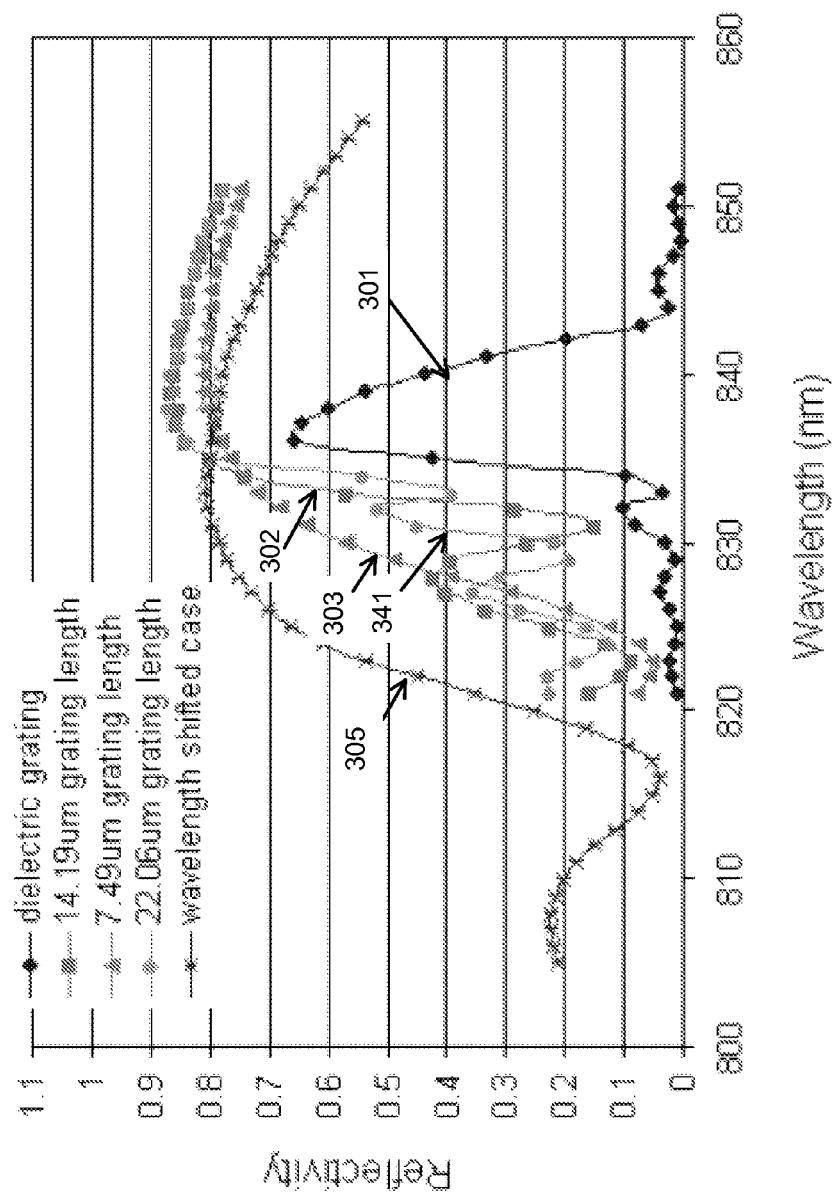
FIG. 3 is a diagram depicting a reflectivity versus wavelength (R v. λ) curve associated with a conventional dielectric grating structure and R v. λ curves associated with various metal grating structures.

FIG. 3 is a diagram depicting a calculated reflectivity versus wavelength (R v. λ) curve 301 associated with a conventional dielectric grating structure and calculated R v. λ curves 302, 303, 304, 305 associated with metal grating structures (e.g., 110 of FIG. 1). The curve 302 is associated with a first metal grating structure having 14.19 μm grating length. The curve 303 is associated with a second metal grating structure having 7.49 μm grating length. The curve 304 is associated with a third metal grating structure having 7.49 μm grating length. The curve 305 is associated with a fourth (wavelength-shifted) metal grating structure optimized for a particular wavelength (e.g., 836 nm) used for an EAMR application. The fourth metal grating structure is similar to the second metal grating structure associated with the curve 303 except for one or more of the grating pitch 115 and the duty cycle. The curve 305 is substantially similar to the curve 303 in shape except that the former is shifted to or centered at a lower wavelength than the latter. This comparison demonstrates that some of the grating parameters (e.g., grating pitch and duty cycle) can be variably selected to change (e.g., wavelength shift) the spectral response of the RWG structure.

In all cases, the metal grating structure has a grating pitch of 470 nm. Comparison of the curve 301 with the curves 302-305 demonstrate that a metal grating structure generally provides a higher peak reflectivity and a wider reflectivity bandwidth than a conventional dielectric grating. Comparisons among the curves 302, 303, 304 demonstrate that, all other parameters being equal, a longer grating length produces a higher reflectivity, and a reflectivity as high as 90% can be achieved.

Figure 4:
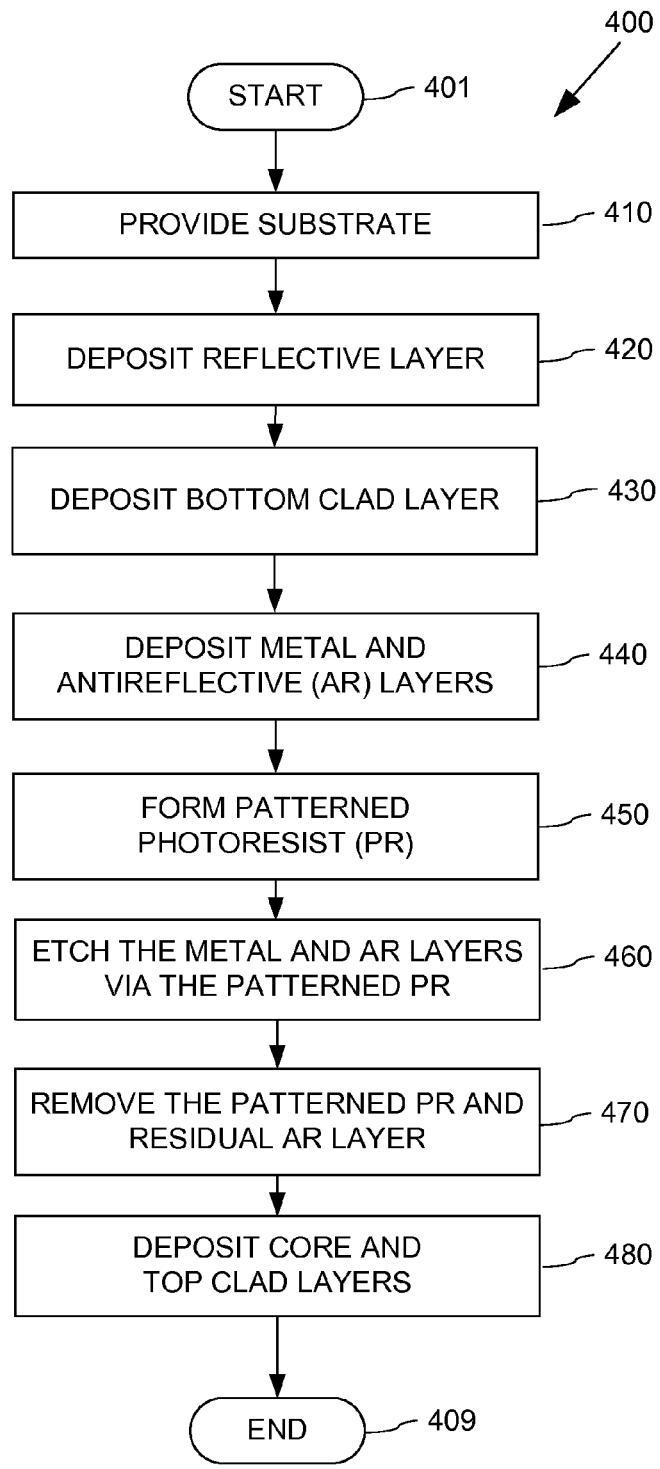
FIG. 4 is a diagram illustrating an exemplary process for fabricating the exemplary RWG structure of FIG. 1 having a metal grating structure at or near an interface between bottom clad and waveguide core layers according to certain aspects of the subject disclosure.
Figure 5A:
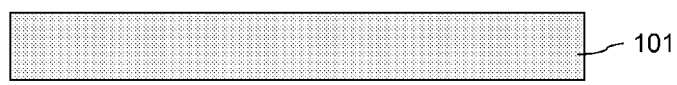
FIGS. 5A-5H represent structures arrived before, during, or after various operations of the illustrated process of FIG. 4 according to certain aspects of the subject disclosure.
Figure 5B:
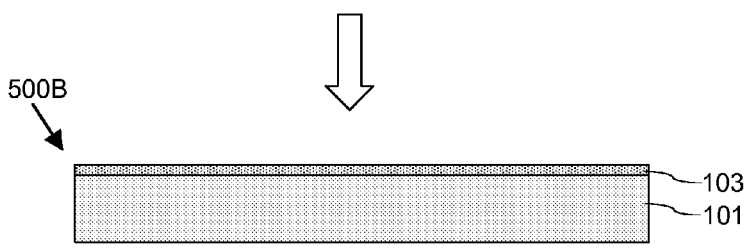

FIG. 4 is a diagram illustrating an exemplary process 400 for fabricating the exemplary RWG structure 100 of FIG. 1 having a metal grating structure at or near an interface between bottom clad and waveguide core layers according to certain aspects of the subject disclosure. FIGS. 5A-5H represent structures arrived before, during, or after various operations of the process 400 of FIG. 4 according to certain aspects of the subject disclosure. The process 400 begins at start state 401 and proceeds to operation 410, in which substrate 101 is provided as shown in FIG. 5A. The process 400 proceeds to operation 420, in which reflective layer 103 is deposited, over the substrate 101, e.g., by an ion-beam deposition (IBD) or chemical vapor deposition (CVD) process, to arrive at structure 500B of FIG. 5B. As discussed above with respect to FIG. 1, the reflective layer 103 can include any reflective material including, but not limited to, Au, Ag, Al, Cu or a combination thereof.

Figure 5C:
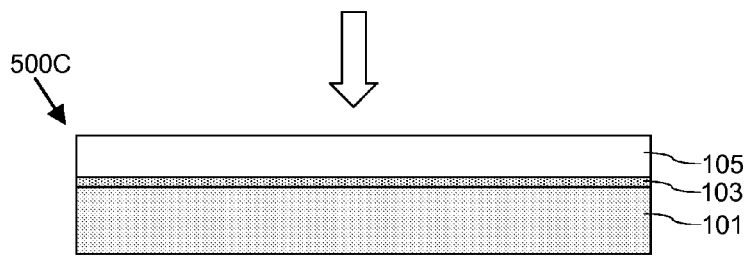

The process 400 proceeds to operation 430, in which bottom clad layer 105 is deposited, over the reflective layer 103, e.g., by a sputtering deposition process, to arrive at structure 500C of FIG. 5C. As discussed above with respect to FIG. 1, the bottom clad layer 103 can include any transparent or semi-transparent material including, but not limited to, $Al_2O_3$ and $SiO_2$. Also as discussed above with respect to FIG. 1, the thickness of the bottom clad layer 105 can be tuned to achieve a correct phase match and to maximize the reflectivity.

Figure 5D:
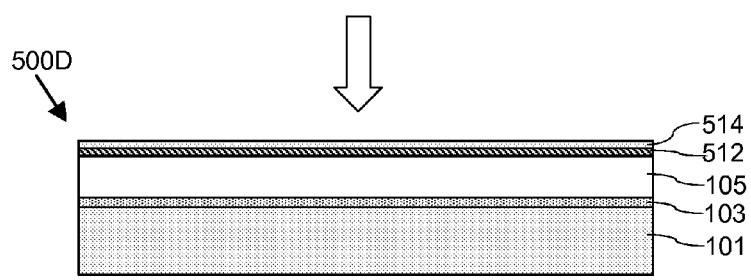

The process 400 proceeds to operation 440, in which metal layer 512 and antireflection (AR) layer 514 are deposited over the bottom clad layer 105 to arrive at structure 500D of FIG. 5D. The metal layer 512 can comprise any conductive material (e.g., a metal or an alloy) including, but not limited to, Au, Ag, Al, or a combination thereof, and may be deposited by, e.g., IBD or DVD deposition process. The AR layer 514 is an optional layer that is deposited in order to reduce or eliminate standing waves in sidewalls of a photoresist during subsequent photolithography process of operation 450 and can comprise organic bottom antireflective coating (BARC). The AR layer 514 can also enhance adhesion of the photoresist. The AR layer 514 can also help to planarize the surface for the subsequent photolithography process.

Figure 5E:
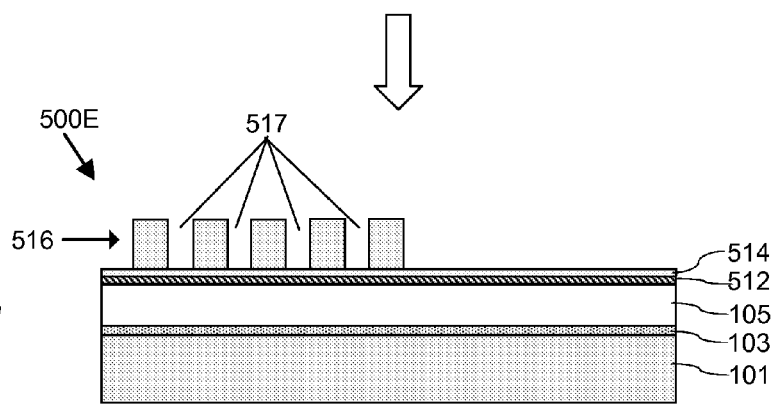

The process 400 proceeds to operation 450, in which patterned photoresist (PR) 516 is formed over the AR layer 514, e.g., by a suitable photolithographic process, to arrive at structure 500E of FIG. 5E. The patterned PR 516 includes a plurality of openings 517 as shown in FIG. 5E.

Figure 5F:
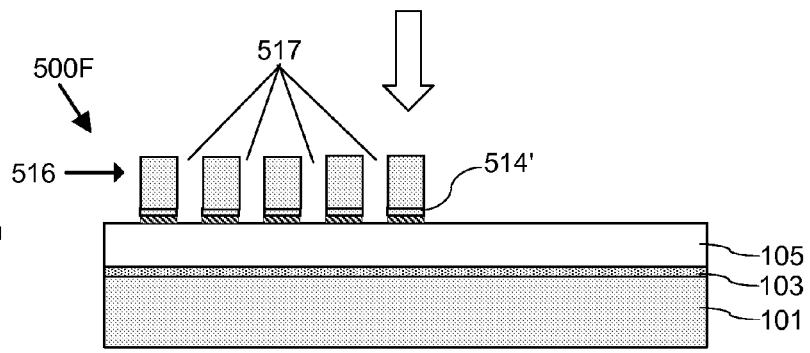

The process 400 proceeds to operation 460, in which portions of the metal and AR layers 512, 514 exposed by the plurality of openings 517 are removed, e.g., by an ion milling process, to arrive at structure 500F of FIG. 5F.

Figure 5G:
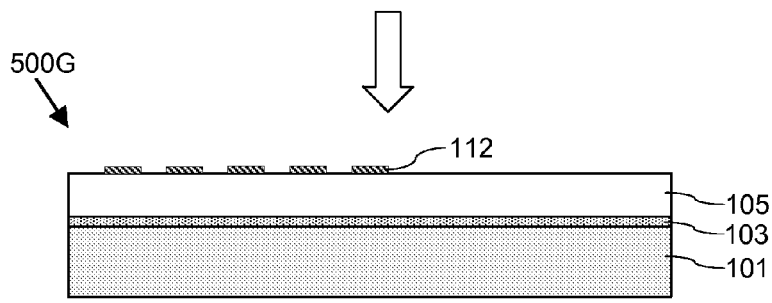

The process 400 proceeds to operation 470, in which the patterned PR 516 and residual portions 514' of the AR layer 514 are removed, e.g., by an $O_2$ plasma etching process, to arrive at structure 500G of FIG. 5G having metal grating structure 112 disposed over the bottom clad layer 105.

Figure 5H:
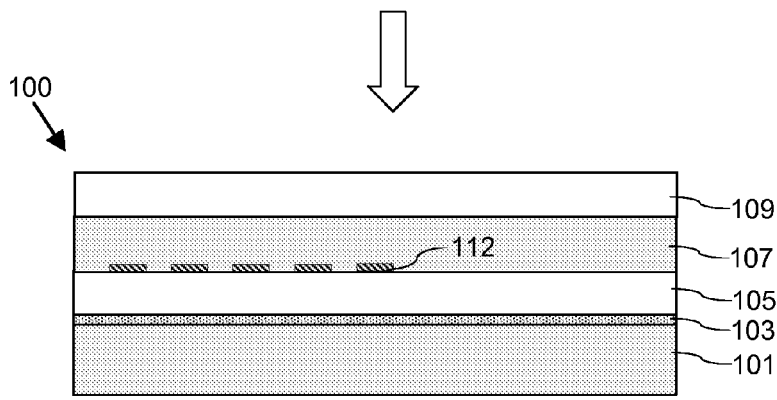

The process 400 proceeds to operation 480, in which waveguide core layer 107 is deposited over the metal grating structure 112 and remaining portions of the bottom clad layer 105 (e.g., regions of the bottom clad layer not covered by ribs of the metal grating structure), and top clad layer 109 is deposited over the waveguide core layer 107 to arrive at the RWG structure 100 shown in FIGS. 1 and 5H. As discussed above with respect to FIG. 1, the waveguide core layer 107 can include any transparent or semi-transparent material including, but not limited to, $TiO_2$, $Ta_2O_5$, Si, SiN, and ZnS, and the top clad layer 109 can include any transparent or semi-transparent material including, but not limited to, $Al_2O_3$ and $SiO_2$. The process 400 ends at state 409.

Figure 6:
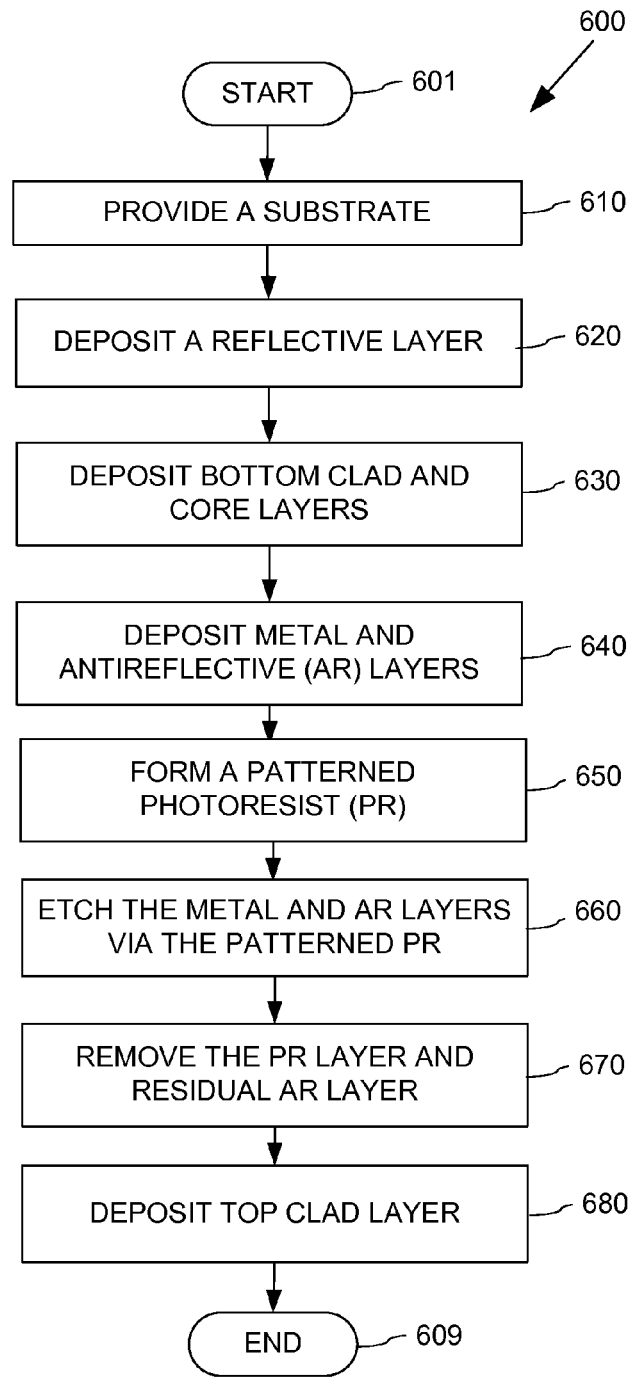
FIG. 6 is a diagram illustrating an exemplary process for fabricating the exemplary RWG structure of FIG. 2 having a metal grating structure at or near an interface between waveguide core and top clad layers according to certain aspects of the subject disclosure.
Figure 7A:
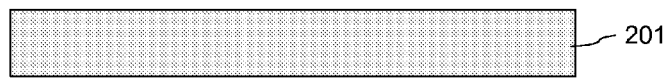
FIGS. 7A-7H represent structures arrived before, during, or after various operations of the illustrated process of FIG. 6 according to certain aspects of the subject disclosure.
Figure 7B:
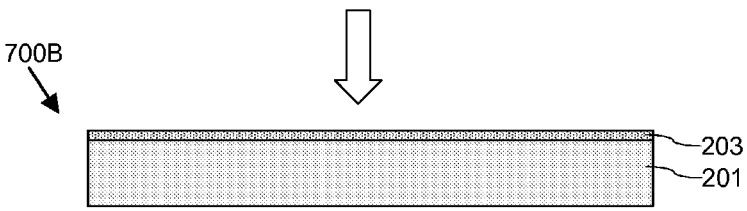

FIG. 6 is a diagram illustrating an exemplary process 600 for fabricating the exemplary RWG structure 200 of FIG. 2 having a metal grating structure at or near an interface between waveguide core and top clad layers according to certain aspects of the subject disclosure. FIGS. 7A-7H represent structures arrived before, during, or after various operations of the process 600 of FIG. 6 according to certain aspects of the subject disclosure. The process 600 begins at start state 601 and proceeds to operation 610, in which substrate 201 is provided as shown in FIG. 7A. The process 600 proceeds to operation 620, in which reflective layer 203 is deposited, over the substrate 201, e.g., by IBD or CVD deposition process, to arrive at structure 700B of FIG. 5B. The reflective layer 203 can include any reflective material including, but not limited to, Au, Ag, Al, Cu or a combination thereof.

Figure 7C:
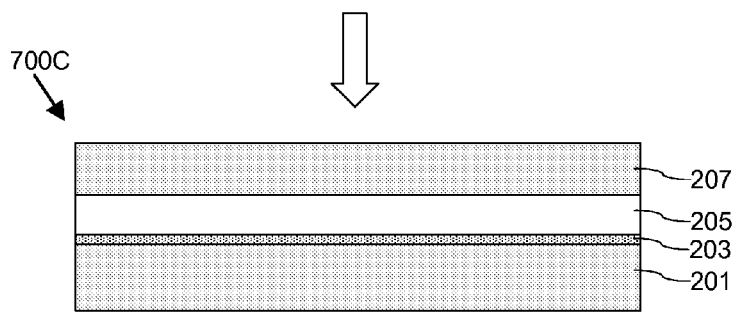

The process 600 proceeds to operation 630, in which bottom clad layer 205 is deposited over the reflective layer 203, e.g., by sputtering deposition process, and waveguide core layer 207 is deposited over the bottom clad layer 205, e.g., by sputtering deposition process, to arrive at structure 700C of FIG. 7C. The bottom clad layer 203 can include any transparent or semi-transparent material including, but not limited to, $Al_2O_3$ and $SiO_2$. The thickness of the bottom clad layer 205 can be tuned to achieve a correct phase match and to maximize the reflectivity. The waveguide core layer 207 can include any transparent or semi-transparent material including, but not limited to, $TiO_2$, $Ta_2O_5$, Si, SiN, and ZnS.

Figure 7D:
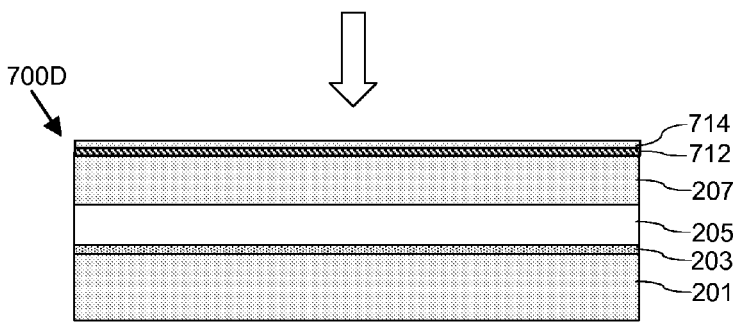

The process 600 proceeds to operation 640, in which metal layer 612 and antireflection (AR) layer 614 are deposited over the bottom clad layer 105 to arrive at structure 700D of FIG. 7D. The metal layer 712 can comprise any conductive material (e.g., a metal or an alloy) including, but not limited to, Au, Ag, Al, or a combination thereof, deposited by, e.g., IBD or CVD deposition process. The AR layer 714 can comprise organic BARC.

Figure 7E:
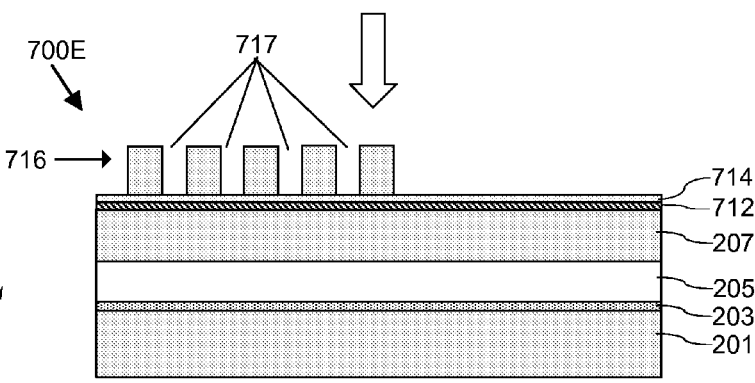

The process 600 proceeds to operation 650, in which patterned photoresist (PR) 716 is formed over the AR layer 714, e.g., by a suitable photolithographic process, to arrive at structure 700E of FIG. 7E. The patterned PR 716 includes a plurality of openings 717 as shown in FIG. 7E.

Figure 7F:
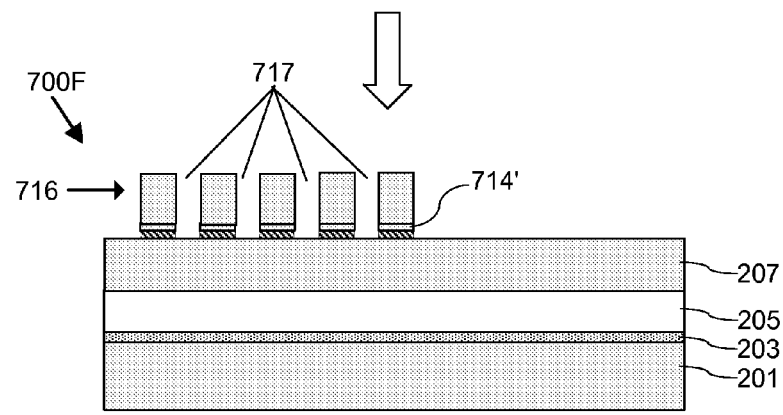

The process 600 proceeds to operation 660, in which portions of the metal and AR layers 712, 714 exposed by the plurality of openings 717 are removed, e.g., by an ion milling process, to arrive at structure 700F of FIG. 7F.

Figure 7G:
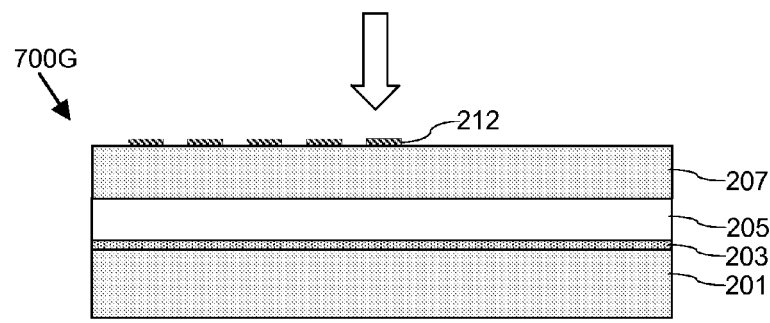

The process 600 proceeds to operation 670, in which the patterned PR 716 and residual portions 714' of the AR layer 714 are removed, e.g., by a wet chemical etching process, to arrive at structure 700G of FIG. 7G having metal grating structure 212 disposed over the waveguide core layer 207.

Figure 7H:
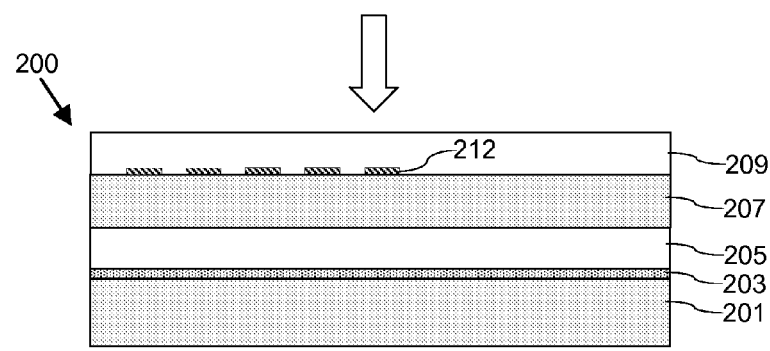

The process 600 proceeds to operation 680, in which top clad layer 209 is deposited over the metal grating structure 212 and remaining portions of the waveguide core layer 207 (e.g., regions of the waveguide core layer not covered by ribs of the metal grating structure) to arrive at the RWG structure 200 shown in FIGS. 2 and 7H. The top clad layer 209 can include any transparent or semi-transparent material including, but not limited to, $Al_2O_3$ and $SiO_2$. The process 600 ends at state 609.

It shall be appreciated by those skilled in the art that illustrated processes 400 and 600 of FIGS. 4 and 6 and their related structures of FIGS. 5A-H and 7A-H are provided for purposes of illustrations only, and various changes, including additions, modifications, and/or deletions, may be made to the processes and structures without departing from the scope of the subject disclosure. By way of example, in some alternative processes, the metal grating structure 110 may be formed within the bottom clad layer 105 rather than the waveguide core layer 107. This can be achieved, for example, by: 1) forming a patterned template (e.g., PR or metal) having a plurality of openings over the bottom clad layer 105; 2) removing (e.g., etching) portions of the bottom clad layer 105 exposed by the plurality of openings; and 3) filling voids created by the etching with a metal, e.g., by IBD deposition process, to form ribs 112 of the metal grating structure 110 embedded in the waveguide core layer 107. Similarly, in some alternative processes, the metal grating structure 210 may be formed within the waveguide core layer 207. This can be achieved, for example, by: 1) forming a patterned template (e.g., PR or metal) having a plurality of openings over the waveguide core clad layer 207; 2) removing (e.g., etching) portions of the waveguide core layer 207 exposed by the plurality of openings; and 3) filling voids created by the removal with a metal, e.g., by IBD deposition process, to form ribs 212 of the metal grating structure 210 embedded in the waveguide core layer 207.

Those skilled in the art shall appreciate that various embodiments of the subject disclosure provide a number of advantages including providing broadband waveguide grating structures having a high reflectivity and a wide bandwidth.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

We claim:

1. A device having a reflective grating structure, comprising:
   a substrate;
   a bottom clad layer on the substrate;
   a waveguide core layer on the bottom clad layer;
   a top clad layer on the waveguide core layer;
   at least one metal grating structure disposed adjacent to an interface between the waveguide core layer and one of the bottom clad layer and the top clad layer, the at least one metal grating structure configured to reflect at least a portion of an incident electromagnetic (EM) radiation coupled into the waveguide core layer; and
   a reflective layer spaced apart from the waveguide core layer such that one of the bottom clad layer and the top clad layer is disposed between the reflective layer and the waveguide core layer, the reflective layer configured to cause an uncoupled portion of an EM radiation traveling away from the waveguide core layer to reflect back toward the waveguide core layer,
   wherein a material of the at least one metal grating is different from a material of the bottom clad layer; and
   wherein a material of the at least one metal grating is different from a material of the top clad layer.

2. The device of claim 1, wherein the at least one metal grating structure is disposed adjacent to the bottom clad layer.

3. The device of claim 2, wherein the at least one metal grating structure is embedded in the waveguide core layer.

4. The device of claim 1, wherein the at least one metal grating structure is disposed adjacent to the top clad layer.

5. The device of claim 1, wherein the reflective layer is disposed between the substrate and the bottom clad layer, the reflective layer configured to cause an uncoupled portion of the EM radiation traveling toward the substrate to reflect back toward the waveguide core layer.

6. The device of claim 1, wherein the at least one metal grating structure comprises a series of metal ribs disposed along a length direction of the waveguide core layer.

7. The device of claim 6, wherein the at least one metal grating structure comprises:
   a grating pitch characterized by a separation between two consecutive metal ribs in the series of metal ribs;
   a duty cycle characterized by a ratio between a length of a metal rib and the separation; and
   a grating length characterized by a total linear distance of the series of metal ribs.

8. The device of claim 7, wherein the grating pitch is in a range between about 400 and 600 nm.

9. The device of claim 7, wherein the duty cycle is in a range between about 25% to 50%.

10. The device of claim 7, wherein the grating length is in a range between about 10 and 200 μm.

11. The device of claim 7, wherein one or more of the grating pitch, the duty cycle, and the grating length are selected so as to maximize a reflectivity at a peak wavelength of the incident EM radiation.

12. The device of claim 7, wherein one or more of the grating pitch, the duty cycle, and the grating length are selected so as to maximize a reflectivity bandwidth of the metal grating structure.

13. The device of claim 1, wherein the bottom clad layer and the top clad layer comprise a material selected from a group consisting of Al2O3 and SiO2.

14. The device of claim 1, wherein the waveguide core layer comprises a material selected from a group consisting of TiO2, Ta2O5, Si, SiN, and ZnS.

15. A method of reflecting an incident electromagnetic (EM) radiation, the method comprising:
  providing a waveguide structure comprising:
    a bottom clad layer;
    a waveguide core layer on the bottom clad layer;
    a top clad layer on the waveguide core layer;
    a reflective layer spaced apart from the waveguide core layer such that one of the bottom clad layer and the top clad layer is disposed between the reflective layer and the waveguide core layer; and
    at least one metal grating structure disposed adjacent to the waveguide core layer;
  coupling an EM radiation into the waveguide core layer; and
  reflecting at least a portion of the coupled EM radiation using the at least one metal grating structure,
  wherein a material of the at least one metal grating is different from a material of the bottom clad layer; and
  wherein a material of the at least one metal grating is different from a material of the top clad layer.

16. The method of claim 15, wherein the at least one metal grating structure is disposed adjacent to the bottom clad layer.

17. The method of claim 15, wherein the at least one metal grating structure is disposed adjacent to the top clad layer.

18. The method of claim 15, wherein the at least one metal grating structure is embedded in the waveguide core layer.

19. The method of claim 15, wherein the at least one metal grating structure comprises a series of metal ribs disposed along a length direction of the waveguide core layer.

20. The method of claim 19, wherein the at least one metal grating structure comprises:
  a grating pitch characterized by a separation between two consecutive metal ribs in the series of metal ribs;
  a duty cycle characterized by a ratio between a length of a metal rib and the separation; and
  a grating length characterized by a total linear distance of the series of metal ribs.

21. The method of claim 20, wherein the grating pitch is in a range between about 400 and 600 nm.

22. The method of claim 20, wherein the duty cycle is in a range between about 25% to 50%.

23. The method of claim 20, wherein the grating length is in a range between about 10 and 200 µm.

24. The method of claim 20, wherein one or more of the grating pitch, the duty cycle, and the grating length are selected so as to maximize a reflectivity at a peak wavelength of the incident EM radiation.

25. The method of claim 20, wherein one or more of the grating pitch, the duty cycle, and the grating length are selected so as to maximize a reflectivity bandwidth of the metal grating structure.

26. The method of claim 15, wherein the bottom clad layer and the top clad layer comprise a material selected from a group consisting of Al2O3 and SiO2.

27. The method of claim 15, wherein the waveguide core layer comprises a material selected from a group consisting of TiO2, Ta2O5, Si, SiN, and ZnS.

28. The method of claim 15, wherein the reflective layer is configured to cause an uncoupled portion of an EM radiation traveling away from the waveguide core layer to reflect back toward the waveguide core layer.

29. The method of claim 28, wherein the reflective layer is disposed on the top clad layer.

30. The method of claim 28, wherein the bottom clad layer is disposed between the reflective layer and the waveguide core layer.

31. The method of claim 15:
  wherein the at least one metal grating structure comprises a series of metal ribs disposed along a length direction of the waveguide core layer; and
  wherein a length of a metal rib in the series of metal ribs is about ¼ of an effective wavelength of the coupled EM radiation.

32. The device of claim 1, wherein the reflective layer is disposed on the top clad layer.

33. The device of claim 1:
  wherein the at least one metal grating structure comprises a series of metal ribs disposed along a length direction of the waveguide core layer; and
  wherein a length of a metal rib in the series of metal ribs is about ¼ of an effective wavelength of the incident EM radiation coupled into the waveguide core layer.

* * * * *